United States Patent
Kent et al.

(10) Patent No.: US 9,534,106 B2
(45) Date of Patent: Jan. 3, 2017

(54) METHOD FOR POLYMERIZNG VINYLIDENE FLUORIDE

(75) Inventors: Bradley Lane Kent, Woolwich Township, NJ (US); Valeriy Kapelyushko, Alessandria (IT); Giulio Brinati, Milan (IT); Alessandro Veneroni, Novate Milanese (IT)

(73) Assignee: SOLVAY SPECIALTY POLYMERS ITALY S.P.A., Bollate (Milan) (IT)

( * ) Notice: Subject to any disclaimer, the term of this patent is extended or adjusted under 35 U.S.C. 154(b) by 271 days.

(21) Appl. No.: 14/125,940

(22) PCT Filed: Jun. 15, 2012

(86) PCT No.: PCT/EP2012/061409
§ 371 (c)(1),
(2), (4) Date: Dec. 12, 2013

(87) PCT Pub. No.: WO2012/175414
PCT Pub. Date: Dec. 27, 2012

(65) Prior Publication Data
US 2014/0121321 A1    May 1, 2014

Related U.S. Application Data

(60) Provisional application No. 61/499,341, filed on Jun. 21, 2011.

(30) Foreign Application Priority Data

Aug. 2, 2011 (EP) .................................... 11176240

(51) Int. Cl.
C08K 5/42 (2006.01)
C08F 14/22 (2006.01)
C08F 214/22 (2006.01)

(52) U.S. Cl.
CPC ................ C08K 5/42 (2013.01); C08F 14/22 (2013.01); C08F 214/22 (2013.01)

(58) Field of Classification Search
USPC .................................................. 524/546, 746
See application file for complete search history.

(56) References Cited

U.S. PATENT DOCUMENTS

| 4,025,709 A * | 5/1977 | Blaise ...................... C08F 14/22 526/225 |
| 4,524,197 A * | 6/1985 | Khan ..................... C08F 214/22 524/545 |
| 6,403,740 B1 | 6/2002 | Uschold |
| 6,774,164 B2 * | 8/2004 | Lyons ..................... C08F 14/18 524/157 |
| 2006/0166007 A1 * | 7/2006 | Kent ....................... C08F 14/18 428/421 |
| 2011/0082271 A1 * | 4/2011 | Brinati ................ C08F 214/182 526/209 |
| 2012/0283382 A1 * | 11/2012 | Spada ..................... C08F 14/22 524/712 |

FOREIGN PATENT DOCUMENTS

| EP | 1229091 A2 * | 8/2002 |
| EP | 1591461 A1 * | 11/2005 |
| WO | 0132726 A1 | 5/2001 |
| WO | 2011073254 A1 | 6/2011 |

* cited by examiner

*Primary Examiner* — Peter D Mulcahy
*Assistant Examiner* — Henry Hu

(57) ABSTRACT

A process for manufacturing a dispersion of a vinylidene fluoride (VDF) thermoplastic polymer [polymer (F)], said process comprising polymerizing VDF in an aqueous phase comprising from 0.5 to 1.5 g/l of at least one surfactant of formula $F-(CF_2CF_2)_3-CH_2CH_2-SO_3X_a$, wherein $X_a$ is H, a alkali metal or a $NR^H_4$ group, with $R^H$ being H or a $C_1$-$C_6$ hydrocarbon group [surfactant (T)] and an organic oxidizing agent [agent (O)] as polymerization initiator.

15 Claims, No Drawings

METHOD FOR POLYMERIZNG VINYLIDENE FLUORIDE

CROSS-REFERENCE TO RELATED APPLICATIONS

This application is a U.S. national stage entry under 35 U.S.C. §371 of International Application No. PCT/EP2012/061409 filed Jun. 15, 2012, which claims priority to U.S. Provisional Application Ser. No. 61/499,341, filed Jun. 21, 2011 and to European Application No. 11176240.7 filed Aug. 2, 2011. The entire contents of these applications are explicitly incorporated herein by this reference.

TECHNICAL FIELD

The invention pertains to a method for polymerizing vinylidene fluoride (VDF) for obtaining VDF polymers having increased thermal stability.

BACKGROUND ART

Vinyiidene fluoride polymers, thanks to their partially fluorinated backbone, have been long known and have been used in a variety of applications because of several desirable properties such as mechanical properties, chemical resistance, thermal resistance, etc.

A frequently used method for producing VDF polymers involves aqueous emulsion polymerization of VDF with optionally one or more fluorinated monomers generally involving the use of fluorinated surfactants.

Frequently used fluorinated surfactants include perfluoroalkyl carboxylic acids and salts thereof. Nevertheless, due to certain environmental concerns, efforts are now devoted to phasing out from such compounds and methods wherein VDF polymer products are manufactured using alternative surfactants having a more favourable toxicological profile are attracting increased attention.

Among polymerization techniques known in the art, a method for manufacturing thermoplastic VDF polymers, wherein certain partially fluorinated surfactants of general formula $R_f$—$C_2H_4$—$SO_3M$, wherein $R_f$ is a perfluorinated radical having 4 to 10 carbon atoms and M is an alkali metal such as lithium, sodium or potassium or an ammonium radical, are used, is known from U.S. Pat. No. 4,025,709 (UGINE KUHLMANN) 24.05.1977. In this document, it is taught that said surfactant should be used in amounts of between 0.2 to 0.5% based on weight of water (2 to 5 g/l).

Nevertheless, VDF polymers obtained from such polymerization process undergo substantial yellowing/darkening phenomena, in particular when exposed to temperature of 260° C. or more, as an evidence of thermal degradation issues.

On the other side, similar fluorosurfactants have been used in the past for the manufacture of fluoroelastomers.

Thus, U.S. Pat. No. 4,524,197 (DUPONT DE NEMOURS) 18 Jun. 1985 discloses a process for manufacturing VDF-based fluoroelastomers in the presence of surfactants of formula: F—$(CF_2CF_2)_n$—$CH_2CH_2OSO_3M$, with n=2-8 and M is an alkali metal cation, hydrogen or ammonium. These sulphate surfactants are nevertheless endowed with active tension properties which are less advantageous over corresponding sulphonic counterparts.

Finally, U.S. Pat. No. 6,774,164 (DUPONT DOW ELASTOMERS L.L.C) Oct. 8, 2004 discloses an emulsion polymerization process for the production of fluoroelastomers in the presence of a surfactant of formula F—$(CF_2CF_2)_n$—$CH_2CH_2$—$SO_3M$, with n from 2 to 9, and M being a cation of valence of 1, said process being initiated by water-soluble peroxides including ammonium, sodium or potassium salts of hydrogen persulfate.

Nevertheless, polymerization techniques suitable for fluoroelastomers are not directly applicable to the manufacture of thermoplastic VDF polymers, which possess different colloidal behaviour and completely different properties.

Further, in addition, in processes of the prior art, inorganic initiators have been used which, while known for positively affecting colloidal stability of lattices because of the formation of ionic end groups on growing chains, nevertheless lead to products having, because of these very same end-groups, moderated thermal stability, and which are prone to undergo to discoloration phenomena.

There is thus still a shortfall in the art for a method for emulsion polymerizing VDF polymers, which can provide with high conversions, with substantial no reactor build-up nor coagulation losses, thermoplastic VDF polymers having outstanding thermal stability and high molecular weight.

SUMMARY OF INVENTION

The Applicant has now surprisingly found that it can be possible to obtain thermoplastic VDF polymers by emulsion polymerization initiated by certain organic oxidizing agents, in the presence of a well-defined and limited amount of a particular surfactant as below detailed.

It is thus an object of the present invention a process for manufacturing a dispersion of a vinylidene fluoride (VDF) thermoplastic polymer [polymer (F)], said process comprising polymerizing VDF in an aqueous phase comprising from 0.5 to 1.5 g/l of at least one surfactant of formula F—$(CF_2CF_2)_3$—$CH_2CH_2$—$SO_3X_a$, wherein $X_a$ is H, a alkali metal or a $NR^H_4$ group, with $R^H$ being H or a $C_1$-$C_6$ hydrocarbon group [surfactant (T)] and an organic oxidizing agent [agent (O)] as polymerization initiator.

The Applicant has surprisingly found that in above mentioned process, despite the use of such a limited amount of said surfactant (T), even in the absence of inorganic initiators, high monomer conversion, efficient nucleation and colloidal stabilization of the dispersion of the polymer (F) are achieved with substantially no polymer build-up or fouling in the reactor, and substantially no coagulation losses.

Further in addition, the use of such low amount of surfactant (T) combined with the use of an organic oxidizing agent as polymerization initiator surprisingly enables significant improvement in thermal stability and anti-yellowing behaviour of polymer (F).

The expression 'thermoplastic' is used herein to denote a semi-crystalline VDF polymer which can advantageously processed in the melt and which possesses typically a heat of fusion of more than 5 J/g, preferably more than 7 J/g, even more preferably 10 J/g, when measured according to ASTM D 3418.

The vinylidene fluoride thermoplastic polymer [polymer (F)] is preferably a polymer comprising:

(a') at least 60% by moles, preferably at least 75% by moles, more preferably 85% by moles of vinylidene fluoride (VDF);

(b') optionally from 0.1 to 15%, preferably from 0.1 to 12%, more preferably from 0.1 to 10% by moles of a fluorinated monomer different from VDF; said fluorinated monomer being preferably selected in the group consisting of vinylfluoride ($VF_1$), chlorotrifluoroethylene (CTFE), hexafluoropropene (HFP), tetrafluoroethylene (TFE), perfluoromethylvinylether (MVE), trifluoroethylene (TrFE) and mixtures therefrom; and (c') optionally from 0.1 to 5%, by moles, preferably 0.1 to 3% by moles, more preferably 0.1 to 1% by moles, based on the total amount of monomers (a') and (b'), of one or more hydrogenated comonomer(s).

The vinylidene fluoride polymer [polymer (F)] is more preferably a polymer consisting of:

(a') at least 60% by moles, preferably at least 75% by moles, more preferably 85% by moles of vinylidene fluoride (VDF);

(b') optionally from 0.1 to 15%, preferably from 0.1 to 12%, more preferably from 0.1 to 10% by moles of a fluorinated monomer different from VDF; said fluorinate monomer being preferably selected in the group consisting of vinylfluoride ($VF_1$), chlorotrifluoroethylene (CTFE), hexafluoropropene (HFP), tetrafluoroethylene (TFE), perfluoromethylvinylether (MVE), trifluoroethylene (TrFE) and mixtures therefrom.

As non limitative examples of the VDF polymers of the present invention, mention can be notably made of homopolymer of VDF, VDF/TFE copolymer, VDF/TFE/HFP copolymer, VDF/TFE/CTFE copolymer, VDF/TFE/TrFE copolymer, VDF/CTFE copolymer, VDF/HFP copolymer, VDF/TFE/HFP/CTFE copolymer and the like.

The process of the invention is particularly suitable for manufacturing VDF homopolymers.

The melt viscosity of the polymer (F), measured at 232° C. and 100 $\sec^{-1}$ of shear rate according to ASTM D3835, is advantageously of at least 3 kpoise, preferably at least 5 kpoise.

The melt viscosity of the polymer (F), measured at 232° C. and 100 $\sec^{-1}$ of shear rate, is advantageously of at most 60 kpois, preferably at most 40 kpoise, more preferably at most 35 kpoise.

The melt viscosity of VDF polymer is measured in accordance with ASTM test No. D3835, run at 232° C., under a shear rate of 100 $\sec^{-1}$.

The VDF polymer has a melting point of advantageously at least 120° C., preferably at least 125° C., more preferably at least 130° C.

The VDF polymer has a melting point advantageously of at most 190° C., preferably at most 185° C., more preferably at most 170° C.

The melting point ($T_{m2}$) can be determined by DSC, at a heating rate of 10° C./min, according to ASTM D 3418.

As above mentioned, it is essential for the surfactant (T) to be present in the aqueous phase at a concentration of 0.3 to 1.5 g/l.

When the amount of surfactant (T) is below 0.3 g/l, no efficient stabilization is ensured, so that polymer build-up or coagulation losses might happen, and, consequently, conversion is also impaired.

When the amount of surfactant (T) is above 1.5 g/l, polymerization kinetic is negatively affected (with longer durations required for achieving total monomer conversion); furthermore, the thermal stability of the VDF polymers obtained thereof are severely affected, so that substantial yellowing phenomena are observed both at low and high temperature for polymer (F).

The aqueous medium comprises at least 0.3, preferably at least 0.5, more preferably at least 0.7 g/l of surfactant (T); said aqueous medium additionally comprises at most 1.5, preferably at most 1.4 g/l more preferably at most 1.3 g/l of surfactant (T).

Particularly good results have been obtained when the aqueous medium comprised an amount of 0.8 to 1.2 g/l of surfactant (T).

According to certain embodiments, the polymerization process of the invention may be carried out in the presence of an additional surfactant different from surfactant (T) and used in combination thereto. Thus, in the process according to these embodiments, VDF is polymerized in an aqueous phase further comprising an additional surfactant different from surfactant (T).

In particular, said aqueous phase may comprise at least one surfactant of formula:

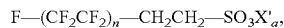

$$F-(CF_2CF_2)_n-CH_2CH_2-SO_3X'_a,$$

with n being equal to 2 or in the range 4-7, and $X'_a$ is H, a alkali metal or a $NR^{H'}_4$ group, with $R^{H'}$ being H or a $C_1$-$C_6$ hydrocarbon group [surfactant (Q)].

It is nevertheless understood that the weight percent of surfactant (T), over the overall weight amount of surfactant (T) and surfactant (Q) used in the polymerization process of the present invention will be generally of at least 90% wt, preferably of at least 95% wt, more preferably of at least 99% wt.

Embodiments wherein surfactant (T) is substantially free from surfactant (Q) as above detailed, are nevertheless preferred, in particular for environmental perspective. It is indeed well known that surfactant (Q) with n=4 might degrade to yield compounds assimilated to perfluorooctanoic acid derivative, whose environmental concerns have recently attracted enormous attention.

According to certain embodiments, the aqueous phase further comprises at least one functional (per)fluoropolyether (functional PFPE) comprising at least one (per) fluoropolyoxyalkylene chain [chain ($R'_F$)] and at least one functional group, said functional PFPE having a number average molecular weight of at least 1000 and a solubility in water of less than 1% by weight at 25° C.

The addition of said high molecular weight functional perfluoropolyether, generally used in very limited amount, can be beneficial for enabling efficient nucleation and tuning of the average particle size of the polymer (F). To this aim, said functional PFPE is present in the aqueous phase in an amount of advantageously 0.001 to 0.3 g/l, preferably of 0.001 to 0.15 g/l, preferably of 0.001 to 0.1 g/l.

The functional PFPE more preferably complies with formula (I) here below:

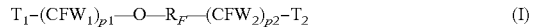

$$T_1-(CFW_1)_{p1}-O-R_F-(CFW_2)_{p2}-T_2 \qquad (I)$$

wherein:

$R_F$ is a (per)fluoropolyoxyalkylene chain [chain ($R'_F$)], as defined above, such that the number average molecular weight of the functional PFPE is at least 1000, preferably at least 1300, more preferably at least 1500;

$T_1$ and $T_2$, equal to or different from each other, are selected from:

i) functional end-groups selected from carboxylic acid, phosphonic acid and sulphonic acid groups, in their acid or salt form, and ii) non-functional end-groups selected from a fluorine atom, a chlorine atom and a $C_1$-$C_3$ (per)fluoroalkyl group comprising, optionally, one or more chlorine atoms, with the proviso that at least one of $T_1$ and $T_2$ is a functional end-group as defined above;

$W_1$ and $W_2$, equal to or different from each other, independently represent a fluorine atom or a —$CF_3$ group;

p₁ and p₂, equal to or different from each other, are independently integers comprised between 1 and 3, preferably being equal to 1 when W₁ and/or W₂ are —CF₃ groups.

The aqueous phase of this embodiment preferably comprises at least one functional PFPE complying with formula (I) as described above wherein both $T_1$ and $T_2$ are functional end-groups as defined above (bifunctional PFPE).

Non-limitative examples of suitable bifunctional PFPEs include, notably, those complying with formula (II) here below:

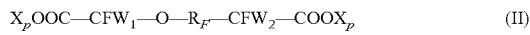
(II)

wherein:
$R_F$ is a (per)fluoropolyoxyalkylene chain [chain $(R'_F)$] as defined above such that the number average molecular weight of the bifunctional PFPE is at least 1000, preferably at least 1300, more preferably at least 1500;
W₁ and W₂, equal to or different from each other, have the same meaning as defined above;
$X_p$, equal to or different from each other, is a hydrogen atom, a monovalent metal, preferably an alkaline metal, or an ammonium group of formula —N(R'ₙ)₄, wherein R'ₙ, equal or different at each occurrence, is a hydrogen atom or a C₁-C₆ hydrocarbon group, preferably an alkyl group.

More preferred aqueous phases comprise at least one bifunctional PFPE complying with formula (III) here below:

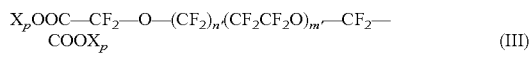
(III)

wherein n' and m' are independently integers>0 such that the number average molecular weight of the bifunctional PFPE is at least 1000, preferably at least 1300, more preferably at least 1500, the recurring units being generally statistically distributed along the perfluoropolyoxyalkylene chain, and $X_p$ has the meaning as above defined.

As said, the polymerization process of the invention is started by a polymerization initiator which is an organic oxidizing agent [agent (O)].

Any of those organic initiators which are known to initiate polymerization of vinylidene fluoride can be used as agent (O). Thus, agent (O) is generally selected from the group consisting of:
diacylperoxides such as diacetylperoxide, disuccinyl peroxide, dipropionylperoxide, dibutyrylperoxide, dibenzoylperoxide, benzoylacetylperoxide, diglutaric acid peroxide and dilaurylperoxide;
dialkylperoxides, including notably ditertbutylperoxide (DTBP), dicumyl peroxide, tert-butylcumyl peroxide, 1,3-1,4-bis(tert-butylperoxyisopropyl)benzene, 2,5 dimethyl 2,5 di(tert-butylperoxyl) hexyne, 2,5-dimethyl-2,5-di(tert-butylperoxyl) hexane;
hydroalkylperoxides, including notably t-butyl hydroperoxide (TBHP), cumene hydroperoxide, tertiaryamylhydroperoxide;
percarboxylic acids esters and salts thereof such as e.g. ammonium, sodium or potassium salt; examples of per-acids include peracetic acid; esters of the peracids can be used as well and examples thereof include alkylperoxyacetates, alkylperoxybenzoates, alkylperoxypivalates, like notably tert-butylperoxyacetate and tert-butylperoxypivalate;
peroxydicarbonates, including notably diisopropylperoxydicarbonate, di-n-propylperoxydicarbonate.

Dialkylperoxides and hydroalkylperoxides, as above detailed, are generally preferred. Among those compounds, DTBP is particularly advantageous.

The amount of initiator typically ranges between 0.01% and 1% by weight, preferably between 0.01 and 0.5% by weight with respect to the weight of the polymer (F) to be produced.

The polymerization process may be carried out in the presence of other materials such as, notably, chain-transfer agents. Non-limitative examples of chain transfer agents suitable for the purpose of the process of the invention include, notably, compounds of formula $R_f(I)_x(Br)_y$, wherein $R_f$ is a C₁-C₈ (per)fluoro(chloro)alkyl group, x and y are independently integers between 0 and 2, the (x+y) sum being comprised between 1 and 2, such as, e.g., 1,4-diiodoperfluorobutane. Further chain-transfer agents which may be used include, notably, C₁-C₅ alkanes such as, e.g., ethane, propane and n-pentane, halogenated hydrocarbons such as, e.g., CCl₄, CHCl₃, CH₂Cl₂, hydrofluorocarbon compounds such as, e.g., CH₂F—CF₃ (R134a), ethers such as, e.g., dimethyl ether and methyl tert-butyl ether and esters such as, e.g., ethyl acetate and malonic esters.

The process of the invention generally comprises the following steps:
a) feeding an aqueous solution of the surfactant (T) into the polymerization reactor, possibly in combination with deionized water, so as to achieve the required concentration of surfactant (T) in the aqueous phase;
b) optionally adding into the aqueous medium chain transfer agent(s), stabilizer(s) and/or other polymerization additive(s);
d) adding vinylidene fluoride (VDF), possibly in combination with other copolymerizable monomers, if required;
d) adding the polymerization initiator and, optionally, during the polymerization, further adding additional amounts of VDF monomer and/or comonomers, initiators, transfer agents;
f) recovering from the reactor the polymer (F) dispersion.

Polymerization is generally carried out at a pressure of at least 350 psi, preferably of at least 400 psi, more preferably of at least 500 psi.

Polymerization can be carried out at a temperature of at least 50° C., preferably of at least 60° C., more preferably of at least 80° C.

Upper temperature is not particularly limited, provided that an aqueous phase is maintained in polymerization conditions. Generally temperature will not exceed 130° C., preferably 125° C.

Should the disclosure of any patents, patent applications, and publications which are incorporated herein by reference conflict with the description of the present application to the extent that it may render a term unclear, the present description shall take precedence.

The invention will be now described with reference to the following examples, whose purpose is merely illustrative and not intended to limit the scope of the invention.

Yellow Index Measurement 5 grams of powder were evenly distributed in an aluminum cup (diameter 6 cm, heigth 2 cm) and maintained at 270° C. for 1 h in a oven. After cooling, the Yellow index was measured using a portable colorimeter (Minolta CR-400) according to the ASTM E313 standard. The diameter of the aluminum cup was chosen to fit the measuring probe of the colorimeter which was inserted for around 1 cm into the cup. Five measurements obtained rotating the colorimeter were averaged to give the reported value Comparative Example 1

A 7.5 liter stainless steel horizontal reactor equipped with a stirrer was charged with 5 375 g of demineralized water and an aqueous solution of a surfactant of formula F—$(CF_2CF_2)_3$—$CH_2CH_2$—$SO_3H$, in such amount that its concentration in the aqueous phase of the reactor was 2.4 g/l.

4 g of paraffinic wax having a melting point between 50° and 60° C. were then added. The reactor was sealed and heated to 100° C. under stirring, degassing for about 2 minutes. The reactor was heated up to 122.5° C.; then vinylidene fluoride was fed into the reactor to reach an inner pressure to 45 bar. The addition of 24.4 ml of di-tertbutyl peroxide (DTBP) initiator was used to start the polymerization. The vinylidene fluoride was continuously added to maintain the reactor pressure at set-point value of 45 bar. About 239 minutes, time necessary for the time necessary for the introduction of a total amount of 2 298 g of monomer, VDF feed was stopped. To optimize the yield, the polymerization was allowed to continue until the reactor pressure decreases to about 11 bar. At this point the reactor was cooled, the unreacted vinylidene fluoride was vented, then the latex was discharged from the reactor and filtered on 80 mesh to remove possible coagula. The latex was found to contain 29.4% by weight of polymer. The reactor was washed to remove the possible coagulum formed during to polymerization. A loss of 2.4% due to the coagulum was evaluated (defined as the percentage of coagulated particles with respect to the initial weight of 2 298 g of vinylidene fluoride). The filtered latex is analyzed by laser light scattering technique and was found to have an average size of the particle diameter of 0.239 μm. The latex was then coagulated by mechanical stirring; the coagulated polymer was washed several times with demineralized water until the washing water conductivity decreases of less than 2 μohm/cm. The wet polymer was dried in a convection stove at 60° C., until the moisture content was lower than 0.15% by weight. The polymer melt viscosity, measured at 232° C. and shear rate 100 $s^{-1}$ with the Kayeness Galaxy capillary rheometer (L/D=15/1) was found to be of 18.9 kP.

A very dark specimen was obtained when coagulated product was melted. Yellow Index measured after thermal aging of the dried powder at 270° C. for 1 hour was found to be 83.3.

Example 2

Same procedure as in example 1 was followed but using an amount of surfactant of formula F—$(CF_2CF_2)_3$—$CH_2CH_2$—$SO_3H$ so as to yield a concentration of 1.2 g/l in the aqueous phase.

After 208 minutes of polymerization, the latex was found to contain 29.7% by weight of polymer having an average size of the particle diameter of 0.297 μm, with a 4.3% wt loss due to the coagulum.

The polymer melt viscosity, measured as above, was of 23.9 kP.

Yellow Index measured after thermal aging of the dried powder at 270° C. for 1 hour was found to be 66.0.

Example 3

Same procedure as in example 1 was followed but using an amount of surfactant of formula F—$(CF_2CF_2)_3$—$CH_2CH_2$—$SO_3H$ so as to yield a concentration of 1.2 g/l in the aqueous phase and adding ammonium hydroxide in such amount that its concentration was 0.07 g/l.

After 187 minutes of polymerization, the latex was found to contain 29.9% by weight of polymer having an average size of the particle diameter of 0.274 μm, with a 3.0% wt loss due to the coagulum.

The polymer melt viscosity, measured as above, was of 32.7 kP.

Yellow Index measured after thermal aging of the dried powder at 270° C. for 1 hour was found to be 49.5.

Example 4

Same procedure as in example 1 was followed but using an amount of surfactant of formula F—$(CF_2CF_2)_3$—$CH_2CH_2$—$SO_3H$ so as to yield a concentration of 1.2 g/l in the aqueous phase and adding sodium hydroxide in such amount that its concentration was 0.17 g/l.

After 199 minutes of polymerization, the latex was found to contain 29.7% by weight of polymer having an average size of the particle diameter of 0.282 μm, with a 3.9% wt loss due to the coagulum.

The polymer melt viscosity, measured as above, was of 30.1 kP.

Yellow Index measured after thermal aging of the dried powder at 270° C. for 1 hour was found to be 40.0.

Example 5

Same procedure as in example 1 was followed but using an amount of surfactant of formula F—$(CF_2CF_2)_3$—$CH_2CH_2$—$SO_3H$ corresponding to a concentration of 0.8 g/l in the aqueous phase, sodium hydroxide at a concentration was 0.10 g/l and adding a bifunctional fluorinated surfactant of formula HOOC—$CF_2$—O—$(CF_2)_{n'}(CF_2CF_2O)_{m'}$—$CF_2$—COOH (with n' and m' being such that the number average molecular weight was 1500) to yield a concentration of 1.0 mg/l.

After 186 minutes of polymerization, the latex was found to contain 29.8% by weight of polymer having an average size of the particle diameter of 0.306 μm, with a 4.6% wt loss due to the coagulum.

The polymer melt viscosity, measured as above, was of 29.3 kP.

Yellow Index measured after thermal aging of the dried powder at 270° C. for 1 hour was found to be 41.6.

Example 6

Same procedure as in example 5 was followed, but using an amount of ethyl acetate of 0.71% by weight (based upon the total weight of VDF fed to the reactor), an amount of bifunctional fluorinated surfactant of 5 mg/l, by initially heating the reactor at 125° C. and a set-point pressure of 50 bar, and decreasing temperature at 115° C. after 1.0% monomer conversion. Total amount of VDF fed was 1950 g, which were reacted after 286 minutes.

After said 286 minutes of polymerization, the latex was found to contain 27.2% by weight of polymer having an average size of the particle diameter of 0.291 μm, with a 4.8% wt loss due to the coagulum.

The polymer melt viscosity, measured as above, was of 7.3 kP.

Yellow Index measured after thermal aging of the dried powder at 270° C. for 1 hour was found to be 57.0.

Example 7

Same procedure as in example 5 was followed, but using ammonium hydroxide (0.05 g/l) instead of sodium hydroxide, and an amount of bifunctional fluorinated surfactant of 5 mg/l.

After 170 minutes of polymerization, the latex was found to contain 29.7% by weight of polymer having an average size of the particle diameter of 0.192 μm, with a 2.9% wt loss due to the coagulum.

The polymer melt viscosity, measured as above, was of 31.7 kP.

Yellow Index measured after thermal aging of the dried powder at 270° C. for 1 hour was found to be 48.3.

Example 8

Same procedure as in example 3 was followed, but using F—(CF$_2$CF$_2$)$_3$—CH$_2$CH$_2$—SO$_3$H in an amount of 0.8 g/l and ammonium hydroxide in an amount of 0.05 g/l.

After 203 minutes of polymerization, the latex was found to contain 29.2% by weight of polymer having an average size of the particle diameter of 0.302 μm, with a 2.5% wt loss due to the coagulum.

The polymer melt viscosity, measured as above, was of 33.9 kP.

Yellow Index measured after thermal aging of the dried powder at 270° C. for 1 hour was found to be 38.2.

Comparative Example 9

Similar procedure as in Example 5 was followed, but using a 21 liter stainless steel horizontal reactor equipped with a stirrer, 14.1 L of demineralized water, an aqueous solution of a surfactant of formula F—(CF$_2$CF$_2$)$_3$—CH$_2$CH$_2$—SO$_3$H, in such amount that its concentration in the aqueous phase of the reactor is 1.0 g/l, and adding same bifunctional fluorinated surfactant of Example 5 in such amount that its concentration in the aqueous phase of the reactor was 50 mg/l. Polymerization temperature was set to 85° C. and set point pressure of 30 bar was initially achieved by feeding a mixture of VDF 72.5% by moles and HFP 27.5% by moles. Then, 285 ml of an aqueous solution of ammonium persulphate having a concentration of 20 g/l were introduced to instantaneously start polymerization the polymerization. Set point pressure (30 bar) was then maintained by feeding a mixture of VDF 87.5% by moles and HFP 12.5% by moles. After 120 minutes, 70 ml of same aqueous solution of ammonium persulphate were further added to the reactor. After 187 minutes, time necessary for the introduction of a total amount of 6 000 g of gaseous mixture, monomers feed was interrupted. After 187 minutes of polymerization, the latex was found to contain 30.5% by weight of polymer having an average size of the particle diameter of 0.141 μm.

The polymer melt viscosity, measured as above, was of 21.6 kP.

Yellow Index measured after thermal aging of the dried powder at 270° C. for 1 hour was found to be 72.

The invention claimed is:

1. A process for manufacturing a dispersion of a vinylidene fluoride (VDF)-containing thermoplastic polymer [polymer (F)], said process comprising polymerizing VDF, optionally in the presence of one or more fluorinated monomer(s) different from VDF and optionally in the presence of one or more hydrogenated comonomer(s), in an aqueous phase, the aqueous phase comprising:
  from 0.5 to 1.5 g/l of at least one surfactant of formula F—(CF$_2$CF$_2$)$_3$—CH$_2$CH$_2$—SO$_3$X$_a$, wherein X$_a$ is H, an alkali metal or a N(R$^H$)$_4$ group, with R$^H$ being H or a C$_1$-C$_6$ hydrocarbon group [surfactant (T)] and
  an organic oxidizing agent [agent (O)] as polymerization initiator, wherein polymer (F) comprises:
  (a') at least 60% by moles of vinylidene fluoride (VDF);
  (b') optionally from 0.1 to 15% by moles of one or more fluorinated monomer(s) different from VDF;
  (c') optionally from 0.1 to 5% by moles, based on the total amount of monomers (a') and (b'), of one or more hydrogenated comonomer(s).

2. The process of claim 1, wherein said polymer (F) is a polymer comprising:
  (a') at least 75% by moles of vinylidene fluoride (VDF);
  (b') optionally from 0.1 to 12% by moles of a fluorinated monomer selected from vinylfluoride (VF$_1$), chlorotrifluoroethylene (CTFE), hexafluoropropene (HFP), tetrafluoroethylene (TFE), perfluoromethylvinylether (MVE), trifluoroethylene (TrFE) and mixtures thereof; and
  (c') optionally from 0.1 to 3% by moles, based on the total amount of monomers (a') and (b'), of one or more hydrogenated comonomer(s).

3. The process of claim 1, wherein the aqueous phase comprises an amount of 0.8 to 1.2 g/l of surfactant (T).

4. The process of claim 1, wherein the aqueous phase further comprises an additional surfactant different from surfactant (T), said additional surfactant complying with formula:

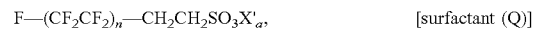

F—(CF$_2$CF$_2$)$_n$—CH$_2$CH$_2$SO$_3$X'$_a$, [surfactant (Q)]

wherein n is equal to 2 or in the range 4-7, and
X'$_a$ is H, an alkali metal or a N(R$^H$)$_4$ group, with R$^{H'}$ being H or a C$_1$-C$_6$ hydrocarbon group.

5. The process of claim 4, wherein the weight percent of surfactant (T), based on the overall weight of surfactant (T) and surfactant (Q), is at least 90% wt.

6. The process of claim 1, wherein the aqueous phase further comprises at least one functional (per)fluoropolyether (functional PFPE) comprising at least one (per)fluoropolyoxyalkylene chain [chain (R'$_F$)] and at least one functional group, said functional PFPE having a number average molecular weight of at least 1000 and a solubility in water of less than 1% by weight at 25° C.

7. The process of claim 6, wherein the aqueous phase comprises at least one bifunctional PFPE of formula (III):

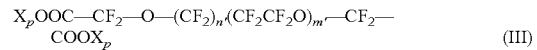

X$_p$OOC—CF$_2$—O—(CF$_2$)$_{n'}$(CF$_2$CF$_2$O)$_{m'}$—CF$_2$—COOX$_p$ (III)

wherein n' and m' are independently integers >0 such that the number average molecular weight of the bifunctional PFPE is at least 1000, the recurring units being generally statistically distributed along the perfluoropolyoxyalkylene chain, and each of X$_p$, equal to or different from each other, is a hydrogen atom, a monovalent metal, or an ammonium group of formula —N(R'$_n$)$_4$, wherein R'$_n$, equal or different at each occurrence, is a hydrogen atom or a C$_1$-C$_6$ hydrocarbon group.

8. The process of claim 7, wherein n' and m' are independently integers >0 such that the number average molecular weight of the bifunctional PFPE is at least 1500, and each X$_p$, equal to or different from each other, is a hydrogen atom, an alkaline metal, or an ammonium group of formula —N(R'$_a$)$_4$, wherein R'$_n$, equal or different at each occurrence, is a hydrogen atom or a C$_1$-C$_6$ alkyl group.

9. The process of claim 1, wherein the agent (O) is selected from the group consisting of:
  diacylperoxides;
  dialkylperoxides;
  hydroalkylperoxides;

percarboxylic acids esters and salts thereof; and peroxydicarbonates.

10. The process of claim 9, wherein the agent (O) is selected from the group consisting of:
diacylperoxides selected from the group consisting of diacetylperoxide, disuccinyl peroxide, dipropionylperoxide, dibutyrylperoxide, dibenzoylperoxide, benzoylacetylperoxide, diglutaric acid peroxide and dilaurylperoxide;
dialkylperoxides selected from the group consisting of ditertbutylperoxide (DTBP), dicumyl peroxide, tert-butylcumyl peroxide, 1,3-1,4-bis(tert-butylperoxyisopropyl)benzene, 2,5-dimethyl-2,5-di(tert-butylperoxyl) hexyne, and 2,5-dimethyl-2,5-di(tert-butylperoxyl) hexane;
hydroalkylperoxides, selected from the group consisting of t-butyl hydroperoxide (TBHP), cumene hydroperoxide, and tertiaryamylhydroperoxide;
percarboxylic acids esters and salts thereof selected from the group consisting of peracetic acid salts and alkylperoxyacetates, alkylperoxybenzoates, and alkylperoxypivalates esters; and
peroxydicarbonates selected from the group consisting of diisopropylperoxydicarbonate, and di-n-propylperoxydicarbonate.

11. The process of claim 9, wherein the agent (O) is selected from dialkylperoxides and hydroalkylperoxides.

12. The process of claim 1, wherein said polymer (F) is a polymer comprising:
(a') at least 85% by moles of vinylidene fluoride (VDF);
(b') optionally from 0.1 to 10% by moles of a fluorinated monomer selected from vinylfluoride (VF$_1$), chlorotrifluoroethylene (CTFE), hexafluoropropene (HFP), tetrafluoroethylene (TFE), perfluoromethylvinylether (MVE), trifluoroethylene (TrFE) and mixtures thereof; and
(c') optionally from 0.1 to 1% by moles, based on the total amount of monomers (a') and (b'), of one or more hydrogenated comonomer(s).

13. The process of claim 1, wherein the aqueous phase comprises:
from 0.8 to 1.2 g/l of at least one surfactant of formula F—(CF$_2$CF$_2$)$_3$—CH$_2$CH$_2$—SO$_3$X$_a$, wherein X$_a$ is H, an alkali metal or a N(R$^H$)$_4$ group, with R$^H$ being H or a C$_1$-C$_6$ hydrocarbon group [surfactant (T)];
at least one bifunctional PFPE of formula (III):

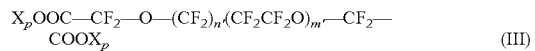

$$X_pOOC-CF_2-O-(CF_2)_{n'}(CF_2CF_2O)_{m'}-CF_2-COOX_p \quad (III)$$

wherein n' and m' are independently integers >0 such that the number average molecular weight of the bifunctional PFPE is at least 1500, the recurring units being generally statistically distributed along the perfluoropolyoxyalkylene chain, and each of X$_p$, equal to or different from each other, is a hydrogen atom, an alkaline metal, or an ammonium group of formula —N(R'$_n$)$_4$, wherein R'$_n$, equal or different at each occurrence, is a hydrogen atom or a C$_1$-C$_6$ alkyl group; and
an organic oxidizing agent [agent (O)] selected from dialkylperoxides and hydroalkylperoxides as a polymerization initiator.

14. The process of claim 13, wherein the melt viscosity of polymer (F), measured at 232° C. and 100 sec$^{-1}$ of shear rate according to ASTM D3835, is between 5 and 35 kpoise.

15. The process of claim 13, wherein yellow index of polymer (F), measured on a 5 gram sample using a colorimeter according to ASTM E313 after heating at 270° C. for 1 hour, is less than about 57.

* * * * *